Patented June 14, 1949

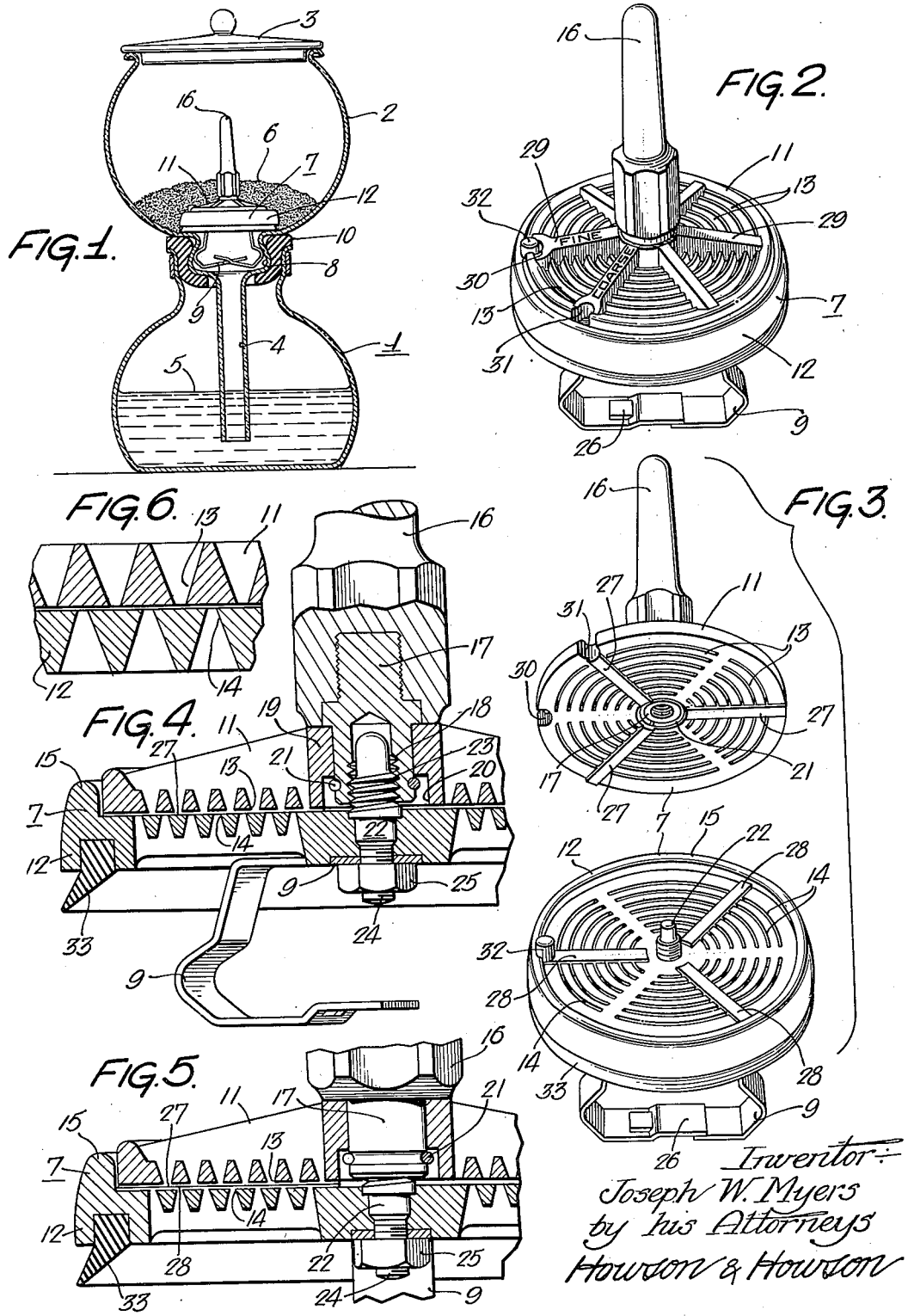

2,472,955

UNITED STATES PATENT OFFICE 2,472,955

COFFEE FILTER

Joseph W. Myers, Philadelphia, Pa., assignor, by mesne assignments, to Proctor Electric Company, Philadelphia, Pa., a corporation of Pennsylvania Application August 11, 1945, Serial No. 610,238

7 Claims. (Cl. 210—162)

This invention relates to coffee filters, and more particularly to a novel filter which is adapted for use in the well-known vacuum type coffee maker.

In the past, coffee makers of this type have generally employed a filter device constructed of fabric material. Such a device is objectionable because it is difficult to keep clean and in time it affects the flavor of the coffee beverage. Moreover, it deteriorates with use and requires periodic replacement.

One object of the present invention is to provide a novel coffee filter which eliminates the aforementioned objections of the ordinary filter, being easy to clean and being so constructed that it does not require replacement.

Another object of the invention is to provide a novel coffee filter which embodies provision for adjustment to accommodate different grinds of coffee, e. g. fine and coarse grinds, and different roasts and blends, and for filtering to several degrees of clarity at the required speed therefor.

A further object of the invention is to provide a coffee filter which is novelly constructed to provide a multiplicity of small passages, the size of which may be varied at will to accommodate different kinds of coffee.

Still another object of the invention is to provide a coffee filter comprising a pair of members having provision for removable attachment to one another, said members being constructed so that the "mesh" of the filter may be varied simply by changing the relative positions of said members during attachment thereof.

Other objects and features of the invention will be apparent as the description proceeds.

In the accompanying drawing:

Fig. 1 is a small scale view, partly in section and partly in elevation, of a vacuum type coffee maker with the novel filter of the present invention disposed therein;

Fig. 2 is a perspective view of the coffee filter;

Fig. 3 is an exploded view showing the detachable parts or members of the filter in perspective;

Fig. 4 is a fragmentary sectional view of the coffee filter, on a relatively large scale, the parts of the filter being positioned for a slow filtering speed for great clarity of the beverage;

Fig. 5 is a similar view, with the parts of the filter positioned for a faster filtering speed and less clarity of the beverage; and Fig. 6 is a greatly enlarged fragmentary sectional view showing the filter passages more clearly.

Referring first to Fig. 1, the vacuum type coffee maker shown comprises the usual water heat-vessel 1 and the coffee infusion vessel 2 with its lid 3. The vessel 2 has the usual tubular portion 4 extending downward into the vessel 1 and adapted to conduct liquid between the two vessels. In operation of this type of coffee maker, the water 5 in vessel 1 is heated and rises upward in the tube 4 into vessel 2 where it comes in contact with the ground coffee 6, the resulting infusion of the heated water and the ground coffee producing the coffee beverage. When substantially all of the heated water has risen into vessel 2, the applied heat is cut off, and the vacuum created within the vessel 1 draws the coffee beverage downward into vessel 1. It is necessary, of course, to provide a filter device to prevent the ground coffee from passing downward into the vessel 1, and the present invention provides a novel filter device designated generally by reference character 7. The filter device is adapted to seat in the lower part of the vessel 2, which is provided with a recessed portion 8 to accommodate a retaining spring member 9 carried by the filter device. A sealing member 10 is provided between the upper part of the vessel 1 and the lower part of vessel 2, as is customary in this type of coffee maker.

Referring now to the other figures of the drawing, the filter device provided by the present invention comprises a pair of members 11 and 12 which are generally of disklike form and which are provided with arcuate openings 13 and 14 of narrow width. Member 12 has a peripheral rim 15 formed thereon, within which member 11 is adapted to seat when the two members are attached together, as shown in Figs. 4 and 5. Preferably the members 11 and 12 are formed of nonmetallic material, such as Bakelite, and a handle 16 of similar material is secured to the member 12 in the manner shown in Figs. 4 and 5. In the lower part of the handle 16, there is provided a metal insert 17 which is recessed and threaded at 18, and which projects through the central hub portion 19 of member 11. The latter is recessed at 20, and a split ring 21 serves to maintain the parts together. The handle 16 is thus rotatably mounted on member 11, the metal insert 17 being rotatable within the hub portion 19. The purpose of this structure will be apparent presently.

Member 12 is provided with a centrally-located fixed metal stud 22, which extends through the central part of said member, as shown in Figs. 4 and 5. The stud 22 is insertable in the metal insert 17, and is threaded at 23, so as to engage the threaded portion 18 of the insert 17. The stud 22 is also threaded at 24 to receive a nut 25. The spring 9, hereinbefore mentioned, is seated in a recess in member 12 and is secured by the stud 22 and nut 25, as shown in Figs. 4 and 5. The ends of the spring 9 are slidably interfitted, as shown at 26 in Fig. 3.

The faces of members 11 and 12, which are adapted to be brought into close adjacency to one another, are flat except for radial raised ribs 27 on member 11 and radial ribs 28 on member 12. These ribs are of very small depth or height, and they serve to establish a close spacing between the faces of members 11 and 12, which spacing may be varied by changing the relative positions of the two members. As shown in Fig. 3, the arcuate apertures in each of the members 11 and 12 occupy six equal sectors defined by six radial portions. Reinforcing ribs, such as shown at 29 in Fig. 2, are provided on the outer sides of the said radial portions of each member. As shown in the upper part of Fig. 3, member 11 has three equally-spaced radial ribs 27 on its inner face, which are preferably one-thousandth of an inch in depth or height. As shown in the lower part of Fig. 3, member 12 also has three equally-spaced radial ribs 28 on its inner face, which are preferably one and one-half thousandths of an inch in depth or height. Both sets of radial ribs terminate short of the center of each member. In order to index the members in different relative positions, member 11 is provided with two recesses 30 and 31, and member 12 is provided with a projection 32 which is adapted to seat in either of the said recesses. When the two members are attached together with projection 32 disposed in recess 30, the ribs 27 and 28 are not aligned, and the space between the adjacent faces of the two members is then established by the ribs 28 alone. However, when the two members are attached together with the projection 32 seated in recess 31, the ribs 27 and 28 are aligned and abut one another, and the space between the members is established by both sets of ribs and is equal to the sum of the depths of the ribs. Thus in one case, the space between the two members will be one and one-half thousandths of an inch, while in the other case, it will be two and one-half thousandths of an inch.

The two conditions are depicted in Figs. 4 and 5. The purpose of this is to adjust the filter for a small or large mesh with corresponding filtering speed and clarity, the small spacing giving greatest clarity but at the expense of increased time for the beverage to pass through. The adjustments are indicated by the legends "fine" and "coarse" on the outer rib structure 29 of member 11, as shown in Fig. 2.

The members 11 and 12 are secured together by first placing them in the desired relative positions and then turning the handle 16 in the direction to engage the screw threads 18 and 23. In this manner, the faces of members 11 and 12 are brought into close relation, as mentioned above, and the said members are securely fastened together.

The arcuate apertures 13 and 14 are formed as illustrated in Figs. 4 to 6 so that they taper inward toward the juxtaposed faces of the two filter members. Moreover, the apertures are offset radially so as to be out of alignment with one another, as clearly shown in Fig. 6. The effect of this is to provide radial passages between the faces of the members 11 and 12, the size of these passages being determined by the ribs 27 and 28, as hereinbefore described. By providing a large number of apertures arranged as clearly shown in Fig. 3, there are provided a large number of radial passages between the members 11 and 12. It will be seen that the structure thus provided is comparable to a screen or sieve having a large number of small openings, but in this instance the "mesh" of the screen or sieve is variable. The apertures 13 and 14 are sufficiently wide at their narrowest portion so that the radial passages control the filtering action.

In use, the filter device is placed within the upper vessel of the coffee maker, as shown in Fig. 1, the spring 9 being forced into the recess 8 and serving to retain the filter device in position. A sealing ring 33 (see Figs. 4 and 5), formed of rubber or the like, is carried by the lower member 12 so as to seat within the vessel 2. During operation of the coffee maker, the filter device permits the water to rise into the upper vessel and it permits the coffee beverage to pass downward into the lower vessel, while preventing the ground coffee from passing into the lower vessel. The fine and coarse adjustment feature of the filter device is highly desirable because it enables rapid and efficient making of the coffee beverage according to the type of the coffee and the clarity desired.

The filter device may be readily cleaned by detaching the parts thereof and allowing water to run through the apertures and over the faces of each part. Moreover, the device is durable and does not require periodic replacement.

It will be seen, therefore, that the filter device provided by the present invention eliminates the objections of the ordinary filter, and also embodies the novel fine-coarse adjustment feature which merely involves different relative positioning of the filter parts when attaching them together.

While the preferred form of the filter device has been illustrated and described, it will be apparent that the device may be variously modified, particularly with respect to the structural details. It is to be understood, therefore, that the invention is not limited to the illustrated device but only by the scope of the appended claims.

I claim:

1. A coffee filter, comprising a pair of disk-like members arranged in closely-spaced face-to-face relation, each of said members having a substantial number of arcuate apertures therein, the apertures of one member being radially off set with respect to those of the other member, whereby there are provided a substantial number of small passages between said members in communication with said apertures, said members being adapted to be disposed in different relative angular positions, and radial ribs on said members adapted to effect different close spacings of said members, according to the relative positions thereof, so as to vary the size of said passages.

2. A coffee filter, comprising a pair of members having provision for removable attachment to one another, said members having faces which are closely adjacent to one another when said members are attached together, said members having apertures so positioned that the apertures of one member are out of alignment with those of the other member when said members are attached together, whereby there are provided a plurality of small passages between the faces of said members, said faces having projections thereon which determine the spacing between said faces, the projections on the two faces having different dimensions, and indexing means on said members for relatively positioning said members so that the projections are aligned or misaligned, thereby to vary the spacing of said faces and thus vary the size of said passages.

3. A coffee filter, comprising a pair of members having provision for removable attachment to one another, said members having circular faces which are closely adjacent to one another when said members are attached together, said members having radially-spaced arcuate apertures so positioned that the apertures of one member are out of alignment with those of the other member when said members are attached together, whereby there are provided a plurality of small passages between the faces of said members, said faces having projections thereon which determine the spacing between said faces, the projections on the two faces having different dimensions, and indexing means on said members for relatively positioning said members so that the projections are aligned or misaligned, thereby to vary the spacing of said faces and thus vary the size of said passages.

4. A coffee filter, comprising a pair of closely-spaced members each having a substantial number of apertures therein, with the apertures of one member offset with respect to those of the other member, whereby there are provided a substantial number of small passages between said members in communication with the said apertures, said members being adapted to be disposed in different relative angular positions, and angularly-spaced projections on said members adapted to effect different close spacings of said members, according to the relative angular positions of said members, so as to vary the size of said passages, the projections on each of said members having sufficient angular spacing throughout the radial dimension of the projections to enable the aforesaid different spacings of said members.

5. A coffee filter, comprising a pair of removably-attached members having confronting faces, each of said members having a substantial number of apertures therein, the apertures of one member being offset with respect to those of the other member, said members being disposable in different relative angular positions, and angularly-spaced projections on the confronting faces of said members adapted to effect different close spacings of said members, according to the different relative angular positions of said members, to provide different sized filter passages between said members according to such different relative angular positions of the members, the projections on each of said members having sufficient angular spacing throughout the radial dimension of the projections to effect the aforesaid different spacings of said members.

6. A coffee filter, comprising a pair of disk-like members, means on said members located centrally thereof for removably attaching the members together in face-to-face relation, each of said members having a substantial number of apertures therein, the apertures of one member being offset with respect to those of the other member, said members being disposable in different relative angular positions, and angularly-spaced projections on the confronting faces of said members adapted to effect different close spacings of said members, according to the different relative angular positions of said members, to provide different sized filter passages between said members according to such different relative angular positions of the members, the projections on each of said members having sufficient angular spacing throughout the radial dimension of the projections to effect the aforesaid different spacings of said members.

7. A coffee filter according to claim 4, including lug and recess indexing means on said members for fixing them in the different relative angular positions.

JOSEPH W. MYERS.

REFERENCES CITED

The following references are of record in the file of this patent:

UNITED STATES PATENTS

| Number | Name | Date |
| --- | --- | --- |
| 1,201,268 | Davis | Oct. 17, 1916 |
| 1,983,142 | Moriya | Dec. 4, 1934 |
| 2,069,939 | Browning | Feb. 9, 1937 |
| 2,240,721 | Selitzky | May 6, 1941 |